United States Patent
Giridharan

(10) Patent No.: US 9,355,099 B2
(45) Date of Patent: May 31, 2016

(54) SYSTEM AND METHOD FOR DETECTING EXPLICIT MULTIMEDIA CONTENT

(71) Applicant: Althea Systems and Software Private Limited, Bangalore (IN)

(72) Inventor: Vamsi Krishna Giridharan, Chittoor (IN)

(73) Assignee: ALTHEA SYSTEMS AND SOFTWARE PRIVATE LIMITED, Bangalore (IN)

( * ) Notice: Subject to any disclaimer, the term of this patent is extended or adjusted under 35 U.S.C. 154(b) by 124 days.

(21) Appl. No.: 13/922,147

(22) Filed: Jun. 19, 2013

(65) Prior Publication Data

US 2014/0164384 A1 Jun. 12, 2014

(30) Foreign Application Priority Data

Dec. 1, 2012 (IN) .......................... 5021/CHE/2012

(51) Int. Cl.
*G06F 17/30* (2006.01)

(52) U.S. Cl.
CPC ...... *G06F 17/3002* (2013.01); *G06F 17/30038* (2013.01); *G06F 17/30705* (2013.01); *G06F 17/30017* (2013.01); *G06F 17/30047* (2013.01); *G06F 17/3053* (2013.01); *G06F 17/30781* (2013.01)

(58) Field of Classification Search
CPC ................ G06F 17/30017; G06F 17/30047; G06F 17/30038; G06F 17/30781; G06F 17/3053
USPC .......................... 707/736, 737, 738, 752, 803
See application file for complete search history.

(56) References Cited

U.S. PATENT DOCUMENTS

| | | | |
|---|---|---|---|
| 7,536,384 B2 * | 5/2009 | Venkataraman et al. | |
| 7,809,705 B2 * | 10/2010 | Dom et al. | 707/706 |
| 8,027,865 B2 * | 9/2011 | Gilbert | G06Q 10/06375 705/7.31 |
| 8,781,816 B2 * | 7/2014 | Goud et al. | 704/10 |
| 8,781,827 B1 * | 7/2014 | White et al. | 704/235 |
| 8,804,005 B2 * | 8/2014 | Mei | G06K 9/00711 348/231.2 |
| 8,869,222 B2 * | 10/2014 | Winograd et al. | 725/110 |
| 8,910,033 B2 * | 12/2014 | Cohen et al. | 715/202 |
| 2002/0055940 A1 * | 5/2002 | Elkan | 707/104.1 |
| 2007/0098267 A1 * | 5/2007 | Lee et al. | 382/224 |
| 2012/0191454 A1 * | 7/2012 | Gabara et al. | 704/246 |
| 2013/0147913 A1 * | 6/2013 | Steiner et al. | 348/43 |

* cited by examiner

*Primary Examiner* — Frantz Coby

(74) *Attorney, Agent, or Firm* — Barry Choobin; Patent 360 LLC

(57) ABSTRACT

A method for classifying a multimedia content is provided. The method includes processing one or more multimedia content to obtain a set of extracted features, performing a topic modeling on the set of extracted features to obtain a set of topic models, and a set of topic keywords. Each of the topic models includes one or more explicit content topics associated with the one or more multimedia content. The method further includes identifying an explicit content topic from the topics based on the set of topic keywords, and a set of predetermined words, processing a multimedia content to obtain at least one feature, and metadata associated with the multimedia content, deriving a topic distribution based on the at least one feature and the topic models, and classifying the multimedia content as (i) an explicit multimedia content, or (ii) a non-explicit multimedia content based on the explicit content topic, and the topic distribution.

8 Claims, 6 Drawing Sheets

SYSTEM AND METHOD FOR DETECTING EXPLICIT MULTIMEDIA CONTENT

BACKGROUND

1. Technical Field

The embodiments herein generally relate to categorization of multimedia content, and more particularly, to a system and method for categorizing explicit and non-explicit multimedia content.

2. Description of the Related Art

The World Wide Web (WWW) includes millions of multimedia content (e.g. videos, pictures etc.). According to a finding, about sixty percent of data consumed on the internet is multimedia content. In this age of information overload, it has become increasingly difficult for a user to locate multimedia content which is relevant. Users may find multimedia content which contain explicit content (e.g., multimedia content may contain excessive use of profane language, abusive language, or that is otherwise unsuitable for viewing by persons below a certain age), in a chance encounter or upon rigorously searching the web.

Typically, labeling and tagging are carried out for classification and for indicating an identity of online content. They may take the form of words, images, or other identifying marks. However, manual tagging is not feasible given an order of magnitude of data. Supervised learning is a machine learning based approach for inferring a function from labeled training data. The labeled training data has pairs consisting of an input feature vector (X) and a desired output value (Y). In the supervised learning based approach, each example is a pair consisting of an input object (typically a vector) and a desired output value. The inferred function should predict a correct output value for any valid input object. This requires a learning algorithm to generalize from the labeled training data to unseen situations in a "reasonable" way. This requires creating good training data, which takes a lot of time and manual effort. Accordingly, there remains a need for automatically categorizing one or more multimedia content as explicit or non-explicit multimedia content.

SUMMARY

In view of the foregoing, an embodiment herein provides a method for classifying a multimedia content. The method includes processing, by a processor, one or more multimedia content, extracting one or more features from metadata obtained from the plurality of multimedia content to obtain a set of extracted features, performing a topic modeling on the set of extracted features associated with the plurality of multimedia content to obtain a set of topic models, and a set of topic keywords. Each of the set of topic models includes one or more explicit content topics that are associated with the each of the plurality of multimedia content. The method further includes identifying at least one explicit content topic from the one or more explicit content topics based on (i) the set of topic keywords, and (ii) a set of predetermined words, processing a multimedia content to obtain at least one feature, and metadata associated with the multimedia content, deriving a topic distribution based on the at least one feature and the set of topic models, and classifying the multimedia content as (i) an explicit multimedia content, or (ii) a non-explicit multimedia content based on the at least one explicit content topic, and the topic distribution.

The explicit multimedia content is identified based on a selection of at least one topic model from the set of topic models. The topic distribution includes a distribution vector of the one or more explicit content topics associated with the one or more multimedia content. The weight of the one or more explicit content topics is based on the topic distribution. The multimedia content is classified as the explicit multimedia content when the weight of the one or more explicit content topics associated with the explicit multimedia content is greater than a threshold weight.

In another aspect, a system for classifying a multimedia content is provided. The system includes a memory storing (a) a database that stores a set of predetermined words, (b) instructions to configure the processor, and (c) a set of modules, and a processor configured by the instructions to execute the set of modules. The set of modules include (i) an offline module, when executed by the processor, processes the one or more multimedia content. The offline module includes (a) a feature extraction module that is capable of extracting one or more features from metadata obtained from the one or more multimedia content to obtain a set of extracted features, and (b) a model creation module that is capable of performing a topic modeling on the set of extracted features associated with the one or more multimedia content to obtain a set of topic models, and a set of topic keywords. Each of the set of topic models includes one or more explicit content topics that are associated with the each of the one or more multimedia content. The set of modules include (ii) a content topic identification module that is capable of identifying at least one explicit content topic from the one or more explicit content topics based on (i) the set of topic keywords, and (ii) a set of predetermined words, and (iii) an online module, when executed by the processor, processes a multimedia content to obtain at least one feature, and metadata associated with the multimedia content.

The online module includes (a) a derivation module that is capable of deriving a topic distribution based on the at least one feature and the set of topic models, and (b) a classification module that is capable of classifying the multimedia content as (i) an explicit multimedia content, or (ii) a non-explicit multimedia content based on the at least one explicit content topic, and the topic distribution.

The multimedia content is classified as the explicit multimedia content based on a selection of at least one topic model from the set of topic models. The topic distribution includes a distribution vector of the one or more explicit content topics associated with the one or more multimedia content. The weight of the one or more explicit content topics is based on the topic distribution. The multimedia content is classified as the explicit multimedia content when the weight of the one or more explicit content topics associated with the explicit multimedia content is greater than a threshold weight.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
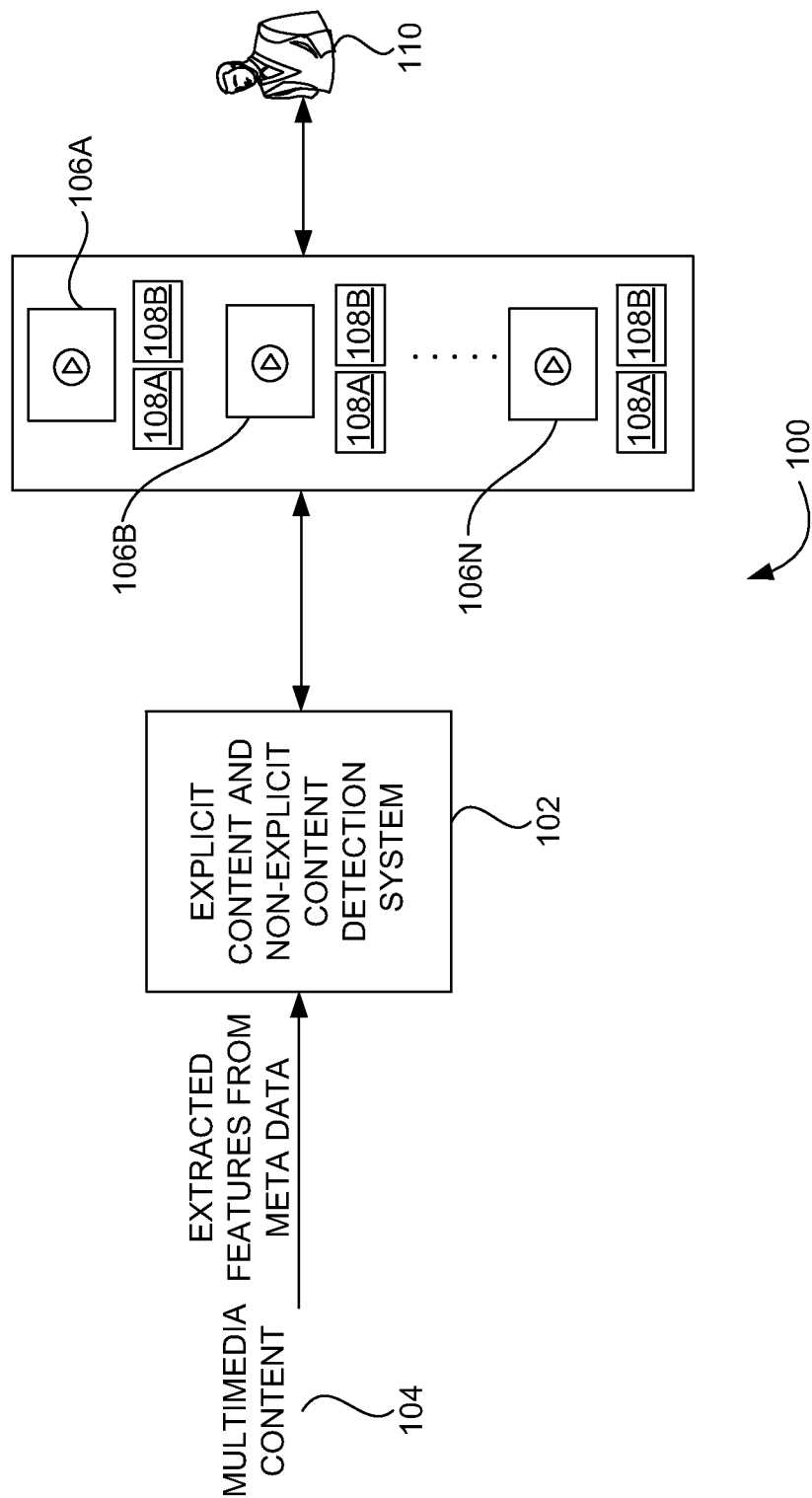
FIG. 1 illustrates a system view of an explicit content and non-explicit content detection system that categorizes multimedia content according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system to categorize one or more multimedia content as explicit or non-explicit multimedia content. The embodiments herein achieve this by providing an explicit content and non-explicit content detection system that categorizes multimedia content into explicit content and/or non-explicit content based on a weak supervised learning approach. Referring now to the drawings, and more particularly to FIGS. 1 through 5, where similar reference characters denote corresponding features consistently throughout the figures, there are shown preferred embodiments.

FIG. 1 illustrates a system view 100 of an explicit content and non-explicit content detection system 102 that categorizes multimedia content 104 according to an embodiment herein. The system view 100 includes the explicit content and non-explicit content detection system 102, multimedia content 104, categorized multimedia content 106A-N, an explicit content 108A, a non-explicit content 108B, and the user 110. The explicit content and non-explicit content detection system 102 categorizes multimedia content 104 into the explicit content 108A and the non-explicit content 108B. In one embodiment, a categorization of the multimedia content 104 is based on an unsupervised learning approach. The explicit content and non-explicit content detection system 102 may receive the multimedia content 104 from one or more sources such as social media, a multimedia content provider, etc. For example, the social media and/or the multimedia content provider may be one or more broadcasting channels (e.g., CNN-IBN, BBC) and/or YouTube™. The explicit content and non-explicit content detection system 102 categorizes the multimedia content 104 to obtain the categorized multimedia content 106A-N. In one embodiment the categorized multimedia content 106A-N may include videos, text, pictures, etc.

The explicit content and non-explicit content detection system 102 may extract one or more features (e.g. vectors (X)) from metadata (e.g. title, description and tags) which are associated with the multimedia content 104. In one embodiment, clustering techniques (e.g., k-means clustering, mixture model, or hierarchical clustering) may be implemented to categorize the explicit content 108A and/or the non-explicit content 108B based on the multimedia content 104. In one embodiment, categorizing of the multimedia content 104 may be through the online processing. The offline processing may include creating topic models by using modeling techniques based on one or more extracted features. In one embodiment, the modeling techniques may include topic modeling. In another embodiment, a topic distribution and topic keywords are created along with the topic models.

The online processing may include topic distribution derived from extracted features of the metadata associated with the multimedia content 104. The explicit content and non-explicit content detection system 102 may classify multimedia content into the explicit content 108A and the non-explicit content 108B based on the topic distribution and explicit content topics identified in the offline processing. In one embodiment, the explicit content 108A may include one or more undesirable multimedia content which are flagged as unreliable or objectionable content (e.g., obscene words and/or profane language).

Figure 2:
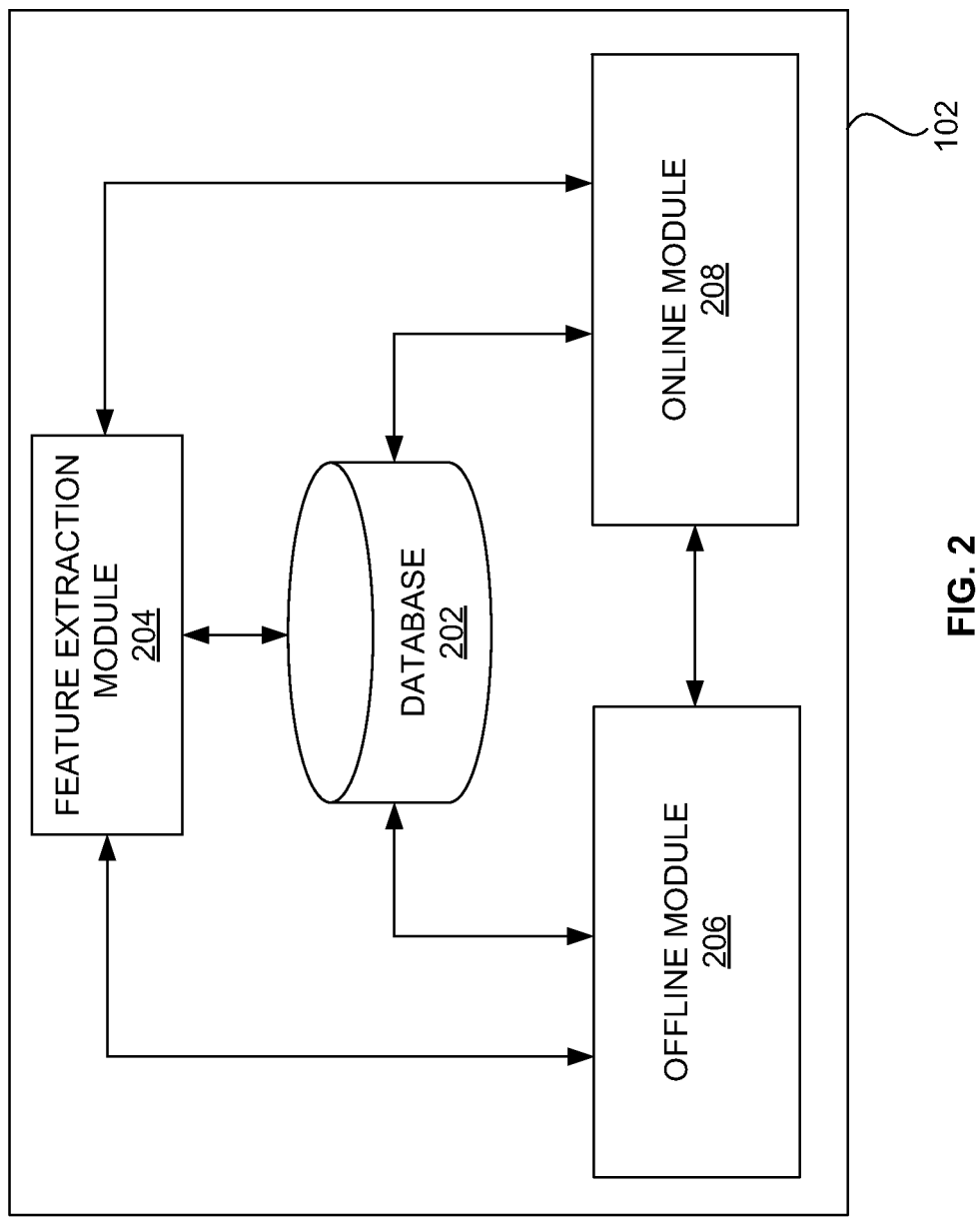
FIG. 2 illustrates an exploded view of the explicit content and non-explicit content detection system of FIG. 1 according to an embodiment herein.

FIG. 2, with reference to FIG. 1, illustrates an exploded view of the explicit content and non-explicit content detection system 102 of FIG. 1 according to an embodiment herein. The explicit content and non-explicit content detection system 102 includes a database 202, a feature extraction module 204, an offline module 206, and an online module 208. The database 202 which stores information associated with the multimedia content 104 such as (i) a predetermined set of words, (ii) topic keywords, (iii) appropriate topics which are relevant to the explicit content 108A, and/or (iv) the metadata (e.g. title, description and tags) which are associated with the multimedia content 104. The feature extraction module 204 extracts the one or more features from the metadata (e.g. title, description, and tags) which are associated with the multimedia content 104. The offline module 206 performs the topic modeling on one or more extracted features of videos to obtain the topic models and the topic keywords. In one embodiment, appropriate topics which are relevant to the explicit content 108A may be selected based on predetermined set of words and the topic keywords. In another embodiment, the predetermined set of words may include one or more words associated with a strong correlation to explicit content. The predetermined set of words may be combined manually to obtain the explicit content topics, in one example embodiment.

The online module 208 derives a topic distribution from the extracted features of the metadata associated with the multimedia content 104 based on the topic models created during the offline processing. In one embodiment, multimedia content is classified into the explicit content 108A and the non-explicit content 108B based on (i) the metadata, (ii) the topic distribution, and explicit content topics identified in the offline processing. For example, when the videos have the explicit content 108A, a flag may be stored in the database 202. The videos that are not flagged may be delivered to the user 110. In another embodiment, the videos that are flagged (indicating an explicit content) may not be delivered to the user 110.

Figure 3:
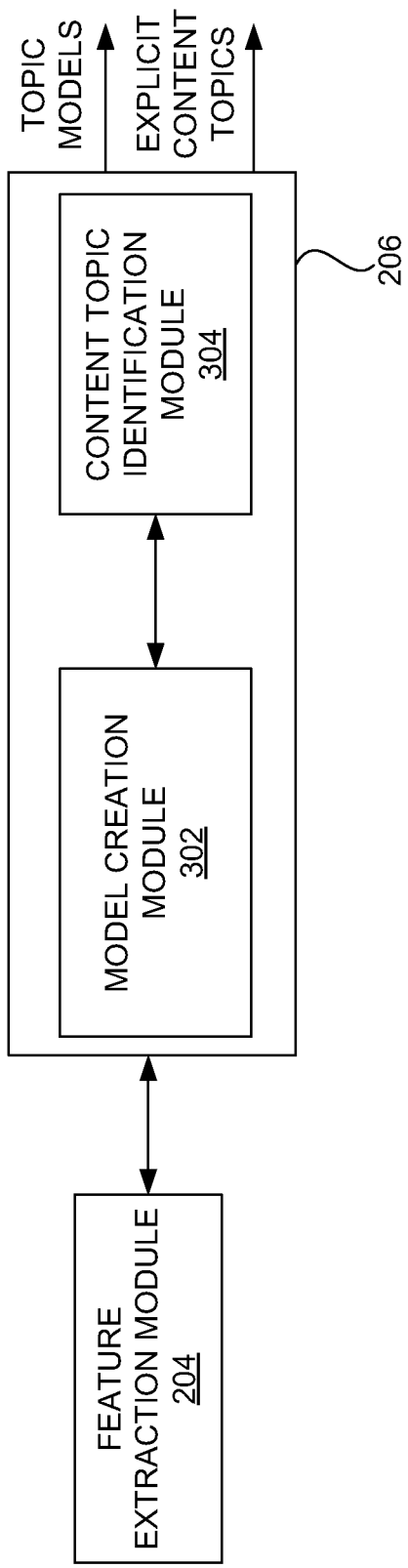
FIG. 3 illustrates an exploded view of the offline module of the explicit content and non-explicit content detection system of FIG. 1 according to an embodiment herein.

FIG. 3, with reference to FIGS. 1 and 2, illustrates an exploded view of the offline module 206 of the explicit content and non-explicit content detection system 102 of FIG. 1 according to an embodiment herein. The offline module 206 includes a model creation module 302, and a content topic identification module 304. The feature extraction module 204 extracts one or more features from metadata (e.g. title, description, tags, etc.) obtained from the one or more multimedia content to obtain a set of extracted features. The model creation module 302 performs a topic modeling on the set of extracted features associated with the one or more multimedia content to obtain a set of topic models, and a set of topic keywords. Each of the set of topic models includes one or more explicit content topics that are associated with the each of the one or more multimedia content. The set of topic models are identified/obtained by performing the topic modeling (which is an unsupervised learning approach) on the set of extracted features, in one example embodiment.

The content topic identification module 304 identifies one or more explicit content topic from the one or more explicit content topics based on (i) the set of topic keywords, and (ii) the set of predetermined words. One or more top models may be selected (using a topic selection module) for categorizing one or more multimedia content, in one example embodiment. The one or more topic models may be created based on one or more explicit content topics, and iterations. For example, (i) a topic model m1 may be created with 100 topics, (ii) a topic model m2 may be created with 200 topics, and (iii) a topic model m3 may be created with 300 topics. In another embodiment, a validation set (e.g., 500) may be created. Accuracy of the validation set may be calculated based on the one or more topic models. For example, the accuracy of the topic model m1 may have an accuracy of 77%, the topic model m2 may have an accuracy of 82%, and the topic model m3 may have an accuracy of 79%. The topic model m2 may then be selected as an accurate model, since it has a greater accuracy.

Figure 4:
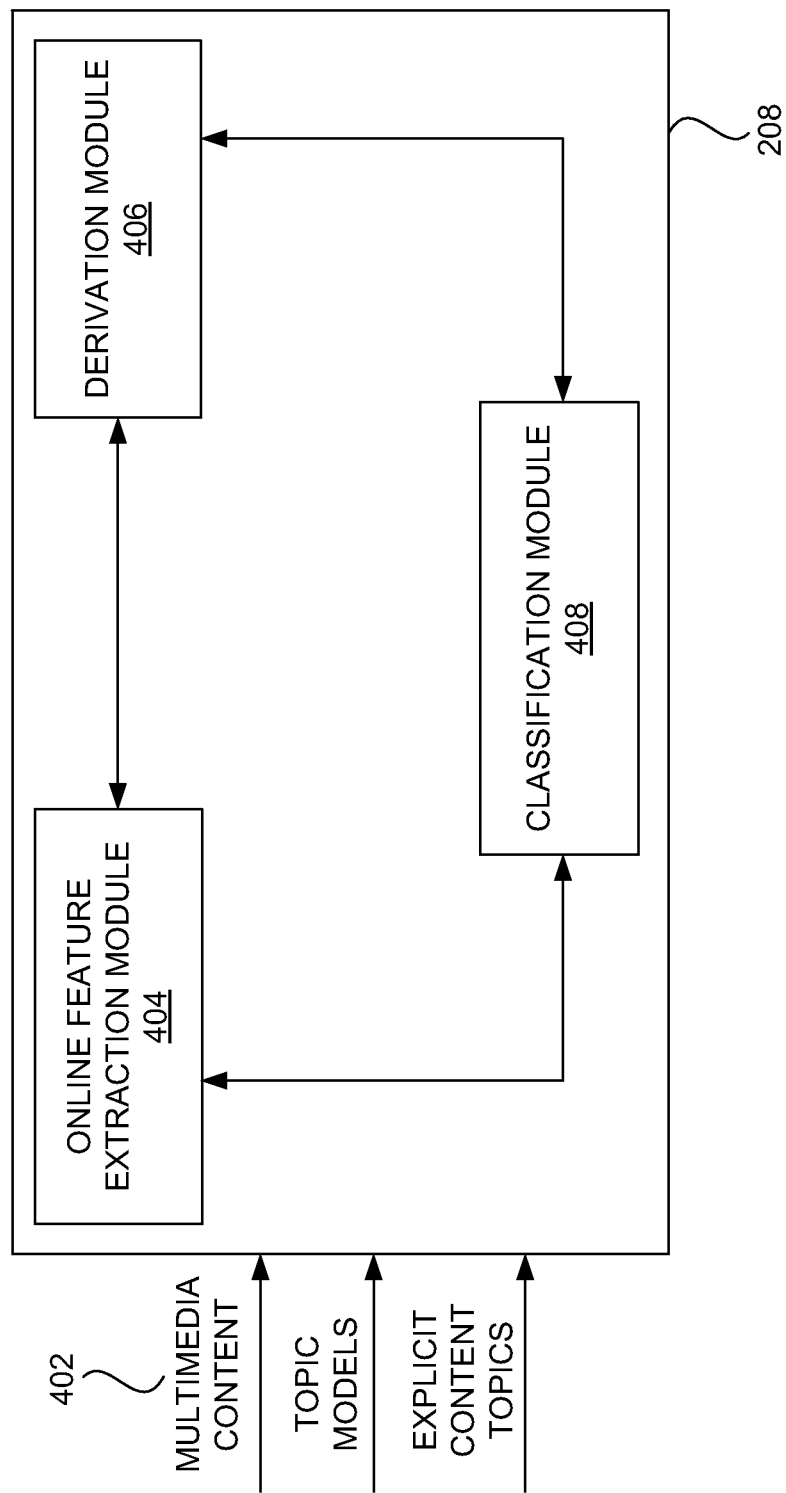
FIG. 4 illustrates an exploded view of the online module of the explicit content and non-explicit content detection system of FIG. 1 according to an embodiment herein.

FIG. 4, with reference to FIGS. 1 through 3, illustrates an exploded view of the online module 208 of the explicit content and non-explicit content detection system 102 of FIG. 1 according to an embodiment herein. The online module 208 includes an online feature extraction module 404, a derivation module 406, and a classification module 408. The online module 208 processes a multimedia content 402 to obtain one or more features, and metadata associated with the multimedia content. The online feature extraction module 404 extracts the one or more features from the multimedia content. The derivation module 406 derives a topic distribution based on (i) the one or more features extracted from the multimedia content, and (ii) the set of topic models. The topic distribution includes a distribution vector of the one or more explicit content topics associated with the one or more multimedia content. For example, the topic distribution for one or more videos may include one or more topic IDs (e.g., 10, 19, 20, 179, and 182). Further, a topic weightage may be associated with the videos (e.g., the topic ID 182 may have topic weight of 37% approximately).

182: 0.37037035822868347
19: 0.18518517911434174
179: 0.1111111119389534
20: 0.1111111119389534
10: 0.1111111119389534

The classification module 408 classifies the multimedia content as (i) an explicit multimedia content 108A, or (ii) a non-explicit multimedia content 108B based on the one or more explicit content topic, and the topic distribution. The multimedia content is classified as the explicit multimedia content based on a selection of at least one topic model from the set of topic models. The multimedia content is classified as the explicit multimedia content when the weight of the at least one topic associated with the explicit multimedia content is greater than a threshold weight. The multimedia content 402 may be detected as explicit multimedia content or non-explicit multimedia content. The explicit multimedia content may be an objectionable content, an undesirable multimedia content, an unreliable content (e.g., pornography content, or adult content). The explicit multimedia content may be an image, a video, an audio, a word processing document, a PDF, and/or combinations thereof. For example, the one or more videos may be classified as the explicit content 108A when (i) a topic weight is more than a threshold weight (e.g., 5%), and (ii) the topic includes explicit content subtopics. In one embodiment, the topic weight may be calculated based on the topic distribution. In other words, the weight of the at least one topic is based on the topic distribution.

The embodiments herein can take the form of an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
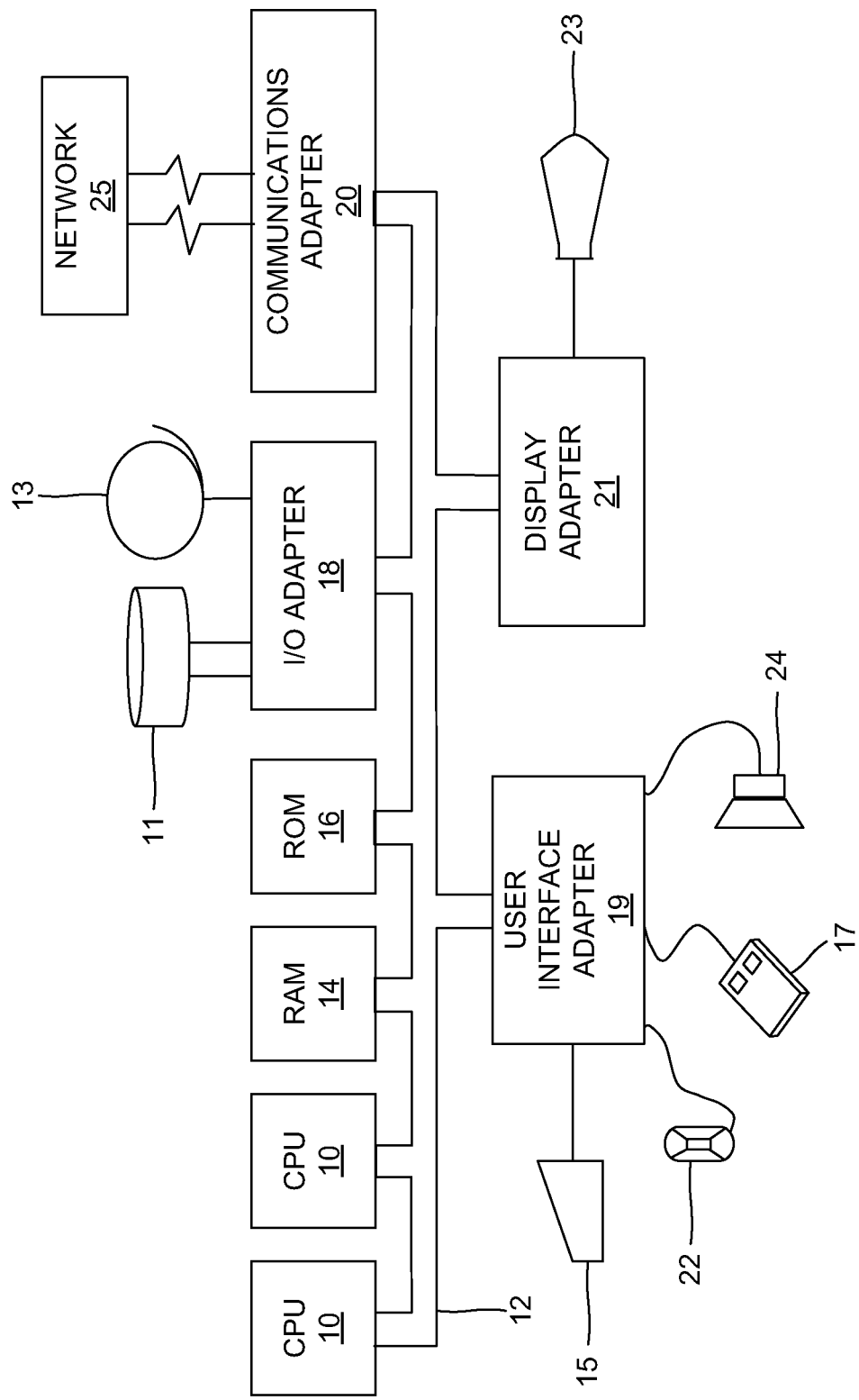
FIG. 5 illustrates a schematic diagram of a computer architecture used according to an embodiment herein.

A representative hardware environment for practicing the embodiments herein is depicted in FIG. 5. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 6:
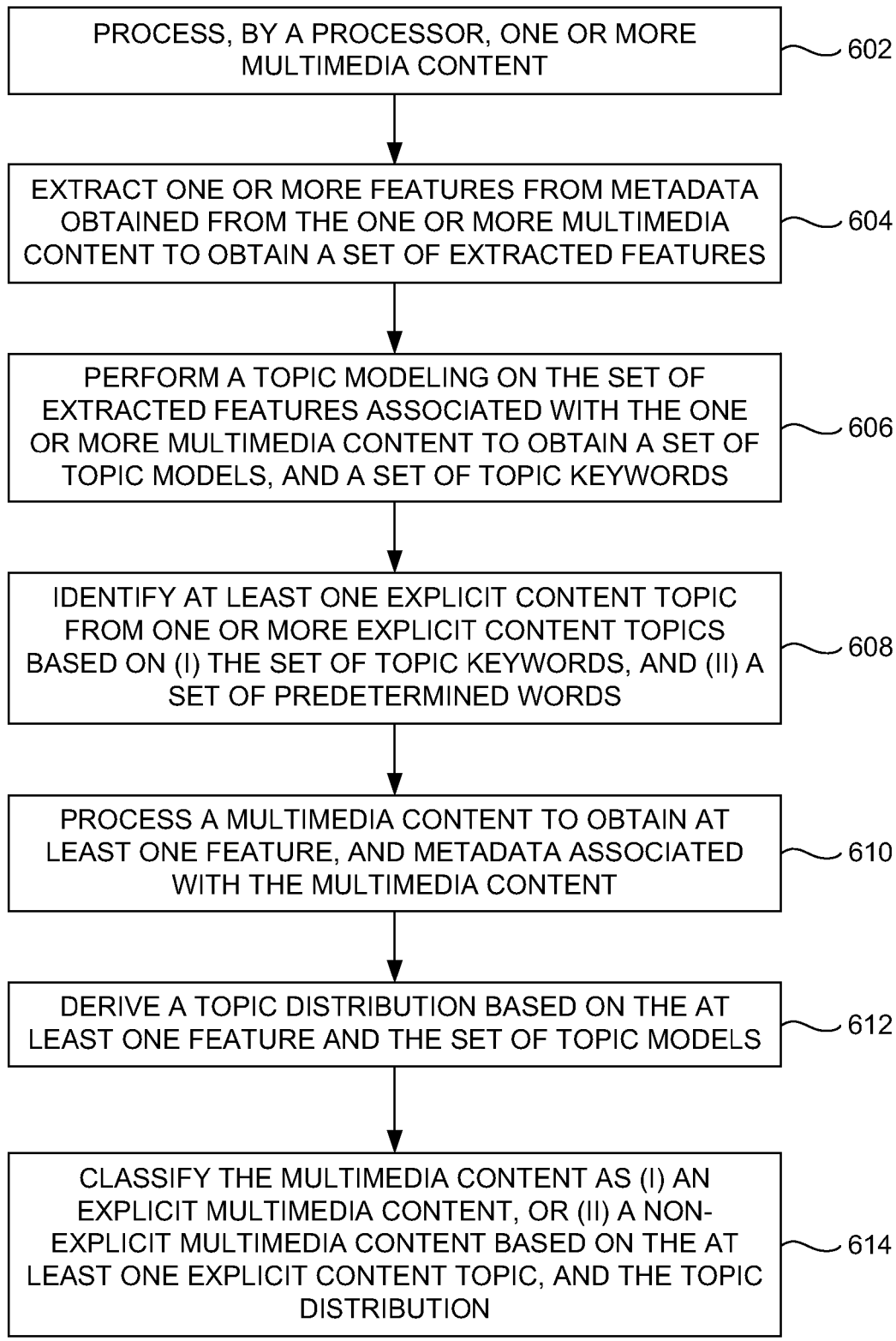
FIG. 6 is a flow diagram illustrating a method of classifying a multimedia content according to an embodiment herein.

FIG. 6, with reference to FIGS. 1 through 5, is a flow diagram illustrating a method of classifying a multimedia content according to an embodiment herein. In step 602, one or more multimedia content (e.g., the multimedia content 104) are processed. In step 604, one or more features are extracted (e.g., using the feature extraction module 204 of FIG. 2) from metadata obtained from the one or more multimedia content to obtain a set of extracted features. In step 606, a topic modeling (which is the unsupervised learning approach) is performed on the set of extracted features associated with the one or more multimedia content to obtain a set of topic models, and a set of topic keywords. Each of the set of topic models includes one or more explicit content topics that are associated with the each of the one or more multimedia content.

In step 608, one or more explicit content topics are identified from the one or more explicit content topics based on (i) the set of topic keywords, and (ii) the set of predetermined words. In step 610, a multimedia content (e.g., the multimedia content 402) is processed to obtain at least one feature, and metadata associated with the multimedia content. One or more features and metadata associated with the multimedia content 402 are extracted using the online feature extraction module 404. In step 612, a topic distribution is derived (using the derivation module 406 of FIG. 4) based on (i) the one or more features extracted from the multimedia content 402, and (ii) the set of topic models.

In step 614, the multimedia content 402 is classified as (i) an explicit multimedia content, or (ii) a non-explicit multimedia content based on the one or more explicit content topics, and the topic distribution. The explicit multimedia content may be an objectionable content, an undesirable multimedia content, an unreliable content (e.g., content that is not suitable for viewing/watching such as pornography, violent, adult, etc.). The explicit multimedia content may be an image, a video, an audio, a word processing document, a PDF, and/or combinations thereof. A sub-set of the multimedia content 104 may be processed to classifying them as explicit or non-explicit multimedia content, in one example embodiment. The entire set of the one or more multimedia content (e.g., the multimedia content 104) may be processed to classifying them as an explicit or a non-explicit multimedia content, in another example embodiment. The one or more multimedia content (e.g., the multimedia content 104) may be periodically updated. Similarly, the set of topic models are periodically updated.

The explicit content and non-explicit content detection system 102 automatically categorizes the multimedia content 104 by the online processing. A labeled training data may not be needed for an automatic categorization of the multimedia content 104. The selection of the explicit content topics is based on any of the language (e.g., English, or non-English language). This unsupervised learning approach can be applied for any language based on an availability corpus for the language. This approach is extremely fast (e.g., takes less than 50 ms to detect video i.e., a video is explicit or not). The accuracy levels can be adjusted based on setting the classifier threshold value (e.g., the classifier threshold value may be set to high when a conservative system is required and similarly a threshold value may be set low when an aggressive system is required).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for classifying a multimedia content, the method comprising steps of:
   processing, by a processor, a plurality of multimedia content, and wherein the multimedia content includes videos, text and pictures;
   extracting a plurality of features from metadata obtained from the plurality of multimedia content to obtain a set of extracted features;
   performing a topic modeling on the set of extracted features associated with the plurality of multimedia content to obtain a set of topic models, and a set of topic keywords, wherein each of the set of topic models comprises a plurality of explicit topics that are associated with the each of the plurality of multimedia content;
   identifying at least one explicit content topic from the plurality of explicit content topics based on the set of topic keywords, and a set of predetermined words;
   processing a multimedia content to obtain at least one feature, and metadata associated with the multimedia content;
   deriving a topic distribution based on the at least one feature and the set of topic models, and wherein the topic distribution comprises a distribution vector of the plurality of explicit content topics associated with the plurality of multimedia content;
   assigning an ID to each topic and assigning a weight to each topic:
   creating a validation set and calculating an accuracy of the validation set based on one or more topic models;
   selecting a topic model based on calculated accuracy value for categorizing one or more multimedia content; and
   classifying the multimedia content as an explicit multimedia content, or a non-explicit multimedia content based on the at least one explicit content topic, and the topic distribution, and wherein the multimedia content is classified based on a topic weight and explicit content sub-topics.

2. The method of claim 1, wherein the explicit multimedia content is identified based on a selection of at least one topic model from the set of topic models.

3. The method of claim 1, wherein the weight is assigned to the plurality of explicit content topics based on the topic distribution.

4. The method of claim 3, wherein the multimedia content is classified as the explicit multimedia content when the weight of at least one topic associated with the explicit multimedia content is greater than a threshold weight.

5. A system for classifying a multimedia content, comprising:
- a memory storing (a) a database that stores a set of predetermined words, (b) instructions to configure the processor, and (c) a set of modules; and
- a processor configured by the instructions to execute the set of modules, wherein the set of modules comprises:
- an offline module, when executed by the processor, processes a plurality of multimedia content, wherein the offline module includes a feature extraction module that is capable of extracting a plurality of features from metadata obtained from the plurality of multimedia content to obtain a set of extracted features; and
- a model creation module that is capable of performing a topic modeling on the set of extracted features associated with the plurality of multimedia content to obtain a set of topic models, and a set of topic keywords, wherein each of the set of topic models comprises a plurality of explicit content topics that are associated with the each of the plurality of multimedia content and
- a content topic identification module that is capable of identifying at least one explicit content topic from the plurality of explicit content topics based on (i) the set of topic keywords, and (ii) the set of predetermined words, wherein an ID is assigned to each topic and assigning a weight to each topic, and wherein a validation set is created and wherein an accuracy of the validation set is calculated based on one or more topic models, and wherein a topic model is selected based on calculated accuracy value for categorizing one or more multimedia content; and
- an online module, when executed by the processor, processes a multimedia content to obtain at least one feature, and metadata associated with the multimedia content, wherein the online module comprises:
- a derivation module that is capable of deriving a topic distribution based on the at least one feature and the set of topic models and
- a classification module that is capable of classifying the multimedia content as (i) all explicit multimedia content, or (ii) a non-explicit multimedia content based on the at least one explicit content topic, and the topic distribution, and wherein the topic distribution comprises a distribution vector of the plurality of explicit content topics associated with the plurality of multimedia content, and wherein the multimedia content is classified based on a topic weight and explicit content subtopics.

6. The system of claim 5, wherein the multimedia content is classified as the explicit multimedia content based on a selection of at least one topic model from the set of topic models.

7. The system of claim 5, wherein the weight is assigned to the plurality of explicit content topics based on the topic distribution.

8. The system of claim 7, wherein the multimedia content is classified as the explicit multimedia content when a weight of at least one topic associated with the explicit multimedia content is greater than a threshold weight.

* * * * *